May 10, 1966  G. T. LYON  3,250,550
SELF-FLARING TUBE COUPLING
Filed Feb. 13, 1964  2 Sheets-Sheet 1
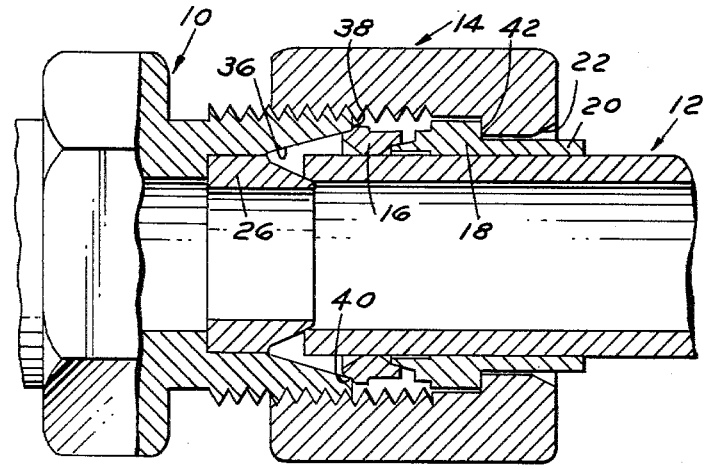
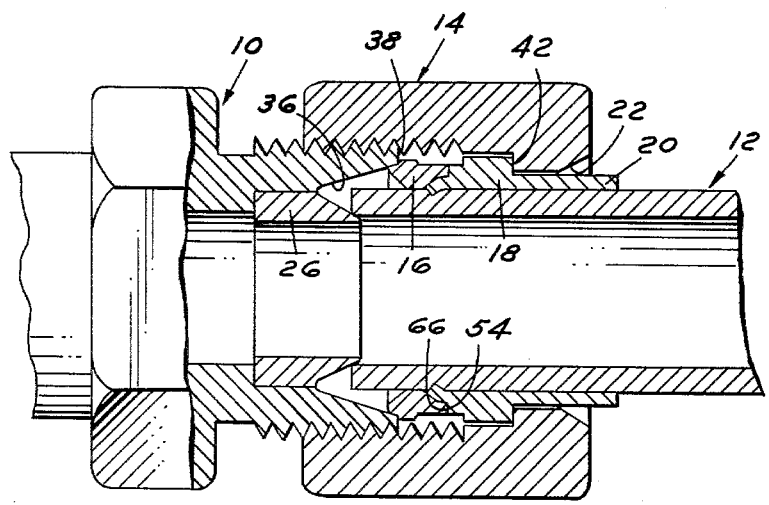
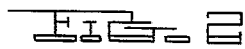
INVENTOR.
GILBERT T. LYON
BY
Burton & Parker
ATTORNEYS May 10, 1966 G. T. LYON 3,250,550
SELF-FLARING TUBE COUPLING
Filed Feb. 13, 1964 2 Sheets-Sheet 2
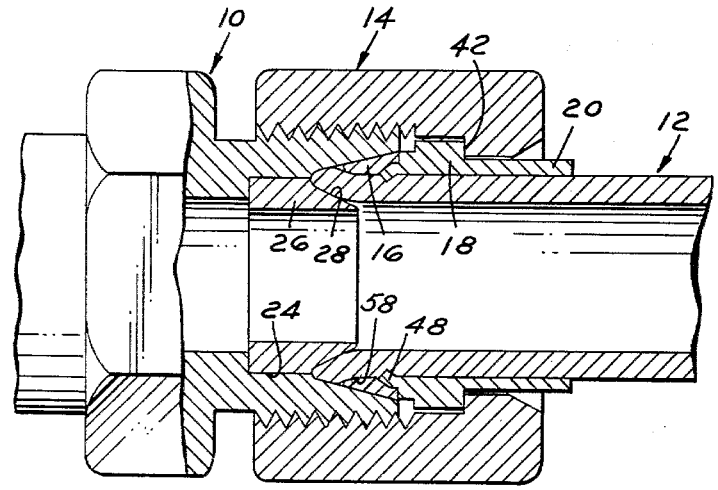
FIG. 3
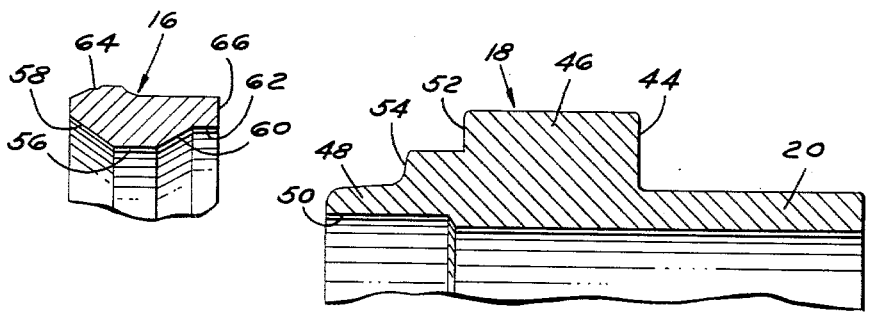
FIG. 4
FIG. 5
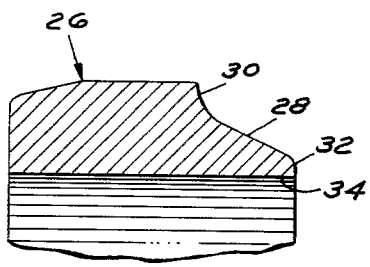
FIG. 6
INVENTOR.
GILBERT T. LYON
BY
Burton & Parker
ATTORNEYS _United States Patent Office_

3,250,550
Patented May 10, 1966

3,250,550
SELF-FLARING TUBE COUPLING
Gilbert T. Lyon, 2009 W. Houstonia, Royal Oak, Mich.
Filed Feb. 13, 1964, Ser. No. 344,764
5 Claims. (Cl. 285—3)

This invention relates to tube couplings, and in particular to the type of coupling commonly referred to as a self-flaring tube coupling.

An object is the provision of a coupling adapted to be secured to the end of a tube for establishing communication between the tube and another part, which coupling is so constructed that during assembly on the tube end, the latter is deformed into face-to-face sealing contact against a coupling part and held securely thereagainst to provide a fluid-tight, pressure resistant connection. A concomitant object is to provide such a coupling which may be easily taken apart and reassembled repeatedly without impairing the sealing efficiency of the coupling.

Another object is the provision of a coupling of the above character including a compression ring and a biting sleeve wherein the sleeve is deformed to bite the tube and shift it into sealing engagement by an internal cam surface on the ring, wherein the ring is held stationary during the biting action and is thereafter radially contracted about the biting portion of the sleeve to reinforce said portion and retain the bite into the tube. A meritorious feature presented by the construction disclosed is that the ring and sleeve members, referred to as the sleeve assembly, are preferably pressed together at the factory, obviating any possibility of their being put together backwards in the field.

Another object is to provide a coupling as described above wherein, upon its assembly on the tube, the tube end is retained against movement and/or deformation in both the radial and axial directions by coupling parts which are in face-to-face abutting relation forming a solid support for the tube end portion received in the coupling. This construction in addition gives the person assembling the coupling a solid "feel" when the parts are tightened together the proper amount, eliminating over or under tightening.

A further object is the provision of a coupling including a sleeve assembly above described closely encircling the tube, one portion of which assembly is received within a cooperating part of the coupling body while the tube end abuts the body, whereby the sleeve assembly and tube are automatically prepositioned in strictly coaxial alignment within the coupling body initially before assembly.

Other objects, advantages and meritorious features will more fully appear from the following description, claims and accompanying drawings wherein:

FIG. 1 is a longitudinal sectional view through a coupling embodying the invention showing the various parts at the initial stage of assembly;

FIG. 2 is a sectional view similar to FIG. 1 showing the coupling in an intermediate stage of assembly with the nut tightened upon the body to an extent sufficent to cam the sleeve member into biting engagement on the tube prior to the tube and sleeve assembly being advanced for flaring;

FIG. 3 is a sectional view similar to FIGS. 1 and 2 showing the coupling in its final assembled position with the flared tube end securely held between the coupling parts;

FIG. 4 is an enlarged fragmentary cross-sectional view of the ring member of the coupling shown in FIGS. 1–3;

FIG. 5 is an enlarged fragmentary cross-sectional view of the sleeve member; and FIG. 6 is an enlarged fragmentary cross-sectional view of the coupling body insert having a tapered nose upon which the tube end is flared.

In the embodiment shown in the drawings there is indicated a portion of an externally threaded coupling body 10, and a tube 12 adapted to be connected to the body. An internally threaded tube nut 14 is threadedly engageable on the body 10, and there is also provided a sleeve assembly including the sleeve member 16 and compression ring 18. Tube 12 and the outer end 20 of encircling sleeve 16 are freely receivable through the bottom opening 22 in nut 14.

Body 10 is provided with a counterbore 24 within which there is seated, preferably in press fit, a nose element 26 upon which the tube end is flared. Nose 26 has a straight tapered surface 28 blending into an arcuate surface 30 at its periphery and terminating in a short radius 32 at the central flow passageway 34, as shown in FIG. 6. Beginning substantially radially opposite the arcuate surface 30 of nose 26, body 10 exhibits an outwardly tapered mouth 36 opening through the inner end face 38 of the body. The mouth of the body has a cylindrical entrance 40, the purpose of which will more fully appear hereinafter. Also, at the opposite end of the taper 36 there is a more abruptly inclined portion 39 immediately adjacent the nose 26.

Nut 14 is provided with a counterbore which terminates in a shoulder 42 adapted to abut the shoulder 44 defined by the outer end of rib 46 on sleeve 18. The sleeve is slidably receivable over the tube 12, and at its inner end is provided with a deformable biting lip 48 (see FIG. 5). The sleeve 18 is counterbored at its inner end at at 50 to normally space the lip 48 from the tube 12. Rib 46 at its inner end exhibits two stepped shoulders 52 and 54, the latter positioned adjacent lip 48, as more fully described below.

Compression ring 16 has a central bore 56 (FIG. 4) fairly closely encircling tube 12, the inner end of the ring being outwardly flared as at 58 and the outer end having a taper 60 terminating in a cylindrical entrance 62. The inner end of the ring 16 is of larger outside diameter than the outer end, and is provided with a slight undercut as at 64 to permit the ring to be piloted within the cylindrical entrance 40 of the body 10.

Referring now particularly to FIG. 1, the coupling is shown in the initial stage of assembly. The ring 16 and sleeve 18 are slidably received over the tube end, and nut 14 is then started onto body 10 until its shoulder 42 abuts surface 44 of the sleeve. The inner end biting lip 48 of sleeve 18 projects within the cylindrical entrance 62 in ring 16. Preferably the interfitting is a press fit, and the sleeve assembly, comprising the sleeve and ring, is made up at the factory to avoid any possibility of putting the parts together backwards in the field. Importantly too, this serves to axially align the sleeve and ring, and as the sleeve closely encircles the tube, the tube is held in axial alignment with respect to the sleeve assembly.

With the sleeve assembly 16, 18 on the tube 12, these parts are inserted into the open mouth of the body, whereat the tube end abuts the nose 26, with the nose end projecting slightly into the tube, as shown in FIG. 1. While the relationship of nose to tube might vary somewhat with different kinds of tubing, the showing of FIG. 1 is representative. At this point the inner end of the ring 16 projects into the mouth of the body, the cylindrical portion defined by undercut 64 on ring 16 being piloted within the cylindrical entrance 40 in body 10. As can be seen from FIG. 1, the piloting of the ring 16 within the body and the piloting of the sleeve within the ring, together with the engagement of the tube end on the nose, serves to maintain all of the parts of the fitting in coaxial alignment during assembly. This is a most desirable feature which is lacking in the prior art couplings of the general character herein disclosed.

With the parts disposed as above described, the nut 14 is further tightened onto body 10 to cause the biting lip 48 on sleeve 18 to be deformed into biting engagement with the tube 12. As the force is transmitted from the nut to the sleeve through the abutting surfaces 42 and 44, the direction of the force is substantially axial, rather than having an appreciable radially inwardly directed component. The lip 48 of the sleeve is deformed against the cam surface 60 on the ring 16, and with the angle of cam surface 60 and the axial force urging sleeve 18, the edge of lip 48 is caused to bite into the tube 12, but there is very little, if any, radial contraction of the tube as is the case with many prior self-flare couplings. As the lip 48 is initially spaced slightly from the tube, the lip is cammed inwardly slightly before it actually touches the tube, obviating to a great extent any tendency of the lip to slide along the tube instead of biting into it.

Referring particularly to FIG. 5, the end of lip 48 is shown as extending radially and forming a right-angle corner adapted to bite the tube. This has been found to work well with the more common tube materials such as ordinary carbon steel or the like. However, some materials such as stainless steel which are hard to machine and which work harden, have been found to require a slightly modified lip for best results. For these materials then, the end of the lip is inclined back toward the shoulder 54 at an angle of fifteen degrees or so with the radius, providing a sharp corner of less than ninety degrees for better penetration of the harder material.

During shifting of the sleeve 18 with nut 14 to cause the lip to bite the tube, ring 16 is held axially stationary by the minute shoulder at 64 on the ring abutting against the end face 38 of the body 10. Hence, during tightening of nut 14 from the position of FIG. 1 to that of FIG. 2, ring 16 has remained stationary, with sleeve 18 shifting therewithin to bite into the tube 12. The interference between the ring and the body is very small, say for example between 0.003 and 0.006 inch.

When the coupling parts assume the position shown in FIG. 2, the lip 48 has bit into the tube 12 as shown and has actually picked up the tube to be shifted conjointly with the sleeve. At this point the opposed surfaces 54 on sleeve 18 and end face 66 on ring 16 may be in contact with each other, or they may be still spaced apart very slightly. In any event, when the parts reach the shown relationship, further tightening of nut 14 produces increased axial forces against ring 16, and the shoulder 64 drops off the face 38, radially contacting the ring slightly and permitting the ring to move axially conjointly with the sleeve 18 and tube 12 into the mouth of the body 10. As this occurs, of course, the axial movement of the tube 12 against the nose 26 starts the flaring of the tube end. As the ring 14 contacts to enter the body it exerts an increased radial force inwardly against the sleeve biting lip 48, insuring that the sleeve will not scrape along the tube when the resistance to axial movement increases as the tube end is flared. However, for the first increment of travel to flare the tube 12, there is no increase of resistance to movement due to shifting of the ring 16 because the entrance 40 of the body mouth is cylindrical, rather than tapered, and the ring, once initially contracted to enter the body, offers no increasing resistance to tightening during the initial tube deformation.

Continued tightening of nut 14 causes increased deformation or flaring of the tube 12 against nose 26, the tube being carried by sleeve 18. As the tube flares, it offers increasing resistance to further deformation, which requires greater forces against the sleeve 18 to shift the tube axially to complete the flare. The tendency then is for the biting lip 48 to slide along the tube, rather than retain its bite, but as the ring 16 has entered the body mouth, any radial expansion of the lip 48 permitting it to lose its bite is effectively prevented.

As the ring 16 rides along the body surface 36 the inner end of the ring is deformed or tipped about a transverse axis of the ring to dispose surface 58 in face-to-face contact with the external surface of the flared tube end as shown in FIG. 3. Slight variations may occur in the position of the tube end once it has been fully flared. The tipping of the ring 16 as the coupling is tightened to its final position insures support for the flared tube end, urging the internal surface thereof into sealing engagement against the tapered nose 26.

If the opposed surfaces 54 and 66 on the sleeve and ring respectively do not contact each other before the ring contracts to enter the body mouth, they do come into face-to-face contact as the coupling reaches its final assembled position. Abutment of these surfaces and surfaces 42 and 44 on the nut and sleeve permit sufficient axial force to be transmitted to the ring by tightening of the nut to cause the tapered surface 58 to intimately contact the tube and conform to any slight variations in the angle or flare. The unique construction of the coupling achieves a deformation of the tube end to provide a seal by a straight axial thrust against the tube rather than by a radial contraction of the tube against a beveled nose.

As the ring 16 is axially compressed upon forcing it into the body 10, and tipping of the ring occurs, there may be set up in the ring, due to the resiliency of the material, a spring back tendency which will contribute to the ease of disassembling the coupling. One of the problems in couplings of the type adapted to seal metal tubing has been difficulty of achieving an adequate seal with a structure that is easily taken apart and reassembled without loss of sealing efficiency. The tapered mouth 36 on the body 10 contributes to the ease of coupling disassembly also.

While it was pointed out hereinabove that the surfaces 54 and 66 do not necessarily come into contact as the ring 16 is contracted to begin entry into the mouth of body 10, it can be seen from the drawings that the abutment of these surfaces together effectively limits the depth of bite of the lip 48 into the tube 12. When these faces meet, there can be no further relative movement between the ring and sleeve, and hence no additional biting of the lip 48 into the tube.

As can be seen from FIG. 3, the coupling in its fully assembled position presents a solid section due to the face-to-face engagement between the various parts. The flared tube end is supported in sealing contact against the surface 28 and 30 of nose 26 by the ring 16, which is backed up radially by the inner end of the coupling body 10 and also backed up axially by the rib 46 on sleeve 18 and the surface 42 on the tube nut 14. Thus the end of the tube is positively retained against any radial outward buckling and against axial movement. Further, the construction serves to provide a solid "feel" when the nut has been tightened the proper amount, giving the person assembling the fitting a signal that the coupling is in the proper relation to the tube to effectively seal and retain the tube.

What is claimed is:

1. A self-flaring coupling in combination with a tube, comprising a tubular coupling body having a flared mouth having a given maximum radius and a tapered nose portion coaxially aligned within the mouth and upon which an end of said tube is flared; a sleeve assembly encircling the tube including a sleeve member and a ring member, each member having abutment means thereon with the sleeve inner end defining a deformable biting lip and the ring outer end defining a cam surface against which said lip is deformed, the ring having a radius greater than that of said mouth and normally abutting the coupling mouth and contractibly receivable within the mouth; and nut means engageable on said body abutting the outer end of said sleeve member to shift the sleeve assembly into the coupling body, initial movement shifting the sleeve into the ring forcing the sleeve abutment means into fixed engagement with said ring abutment means and camming said biting lip into biting engagement with said tube and further movement shifting the sleeve and ring members conjointly as a unit into the body mouth thereby inwardly deforming said ring by reducing the said greater radius of said ring member by said flared mouth, said sleeve member thereby carrying the tube therewith to flare the tube end over said tapered nose portion and sealingly grip the flared tube end between said tapered nose and said ring.

2. The invention as defined in claim 1 characterized in that said sleeve member closely slidably encircles said tube and said ring member is captively mounted on the sleeve to insure proper alignment of the tube and the sleeve assembly within the coupling body.

3. The invention as defined in claim 1 characterized in that the said greater radius of said ring member includes a radially projecting shoulder which initially abuts said maximum radius of said mouth.

4. The invention as defined in claim 1 characterized in that the inner end of said ring member exhibits an internally tapered entrance bearing against the flared tube end when the coupling is assembled with said ring member and flared tube end being grippingly compressed between the flared mouth and the tapered nose portion of the coupling body.

5. The invention as defined in claim 4 characterized in that said sleeve member includes a radial shoulder axially abutting the outer end of the ring member when the sleeve member and ring are in axially fixed abutment with one another.

References Cited by the Examiner
UNITED STATES PATENTS

| | | | |
|---|---|---|---|
| 2,466,057 | 4/1949 | Somma | 285—334.5 X |
| 2,850,303 | 9/1958 | Bauer | 285—342 X |
| 2,946,607 | 7/1960 | Bauer | 285—341 X |
| 3,069,199 | 12/1962 | Crawford | 285—382.7 X |

CARL W. TOMLIN, *Primary Examiner.*

T. A. LISLE, *Assistant Examiner.*